Dec. 27, 1966  R. H. GEISLER  3,293,876
REFRIGERATION SYSTEM INCLUDING CONTROL ARRANGEMENT FOR
MAINTAINING HEAD PRESSURE
Filed Oct. 28, 1964
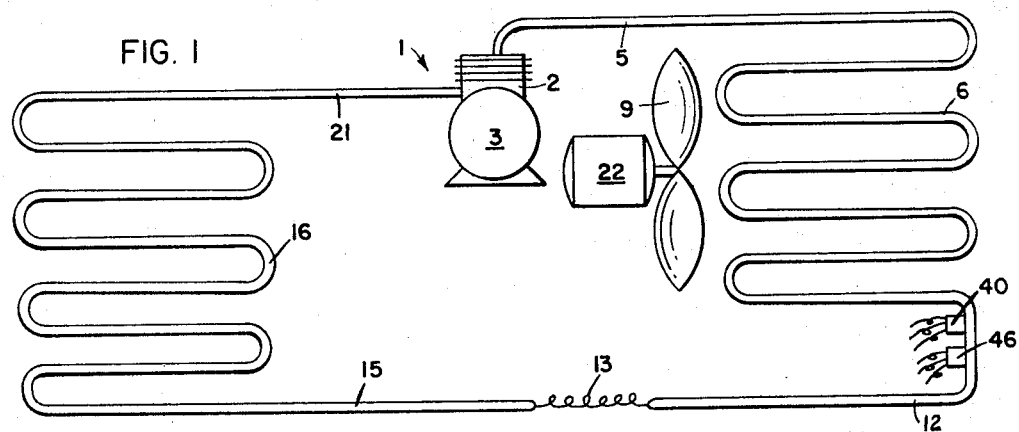
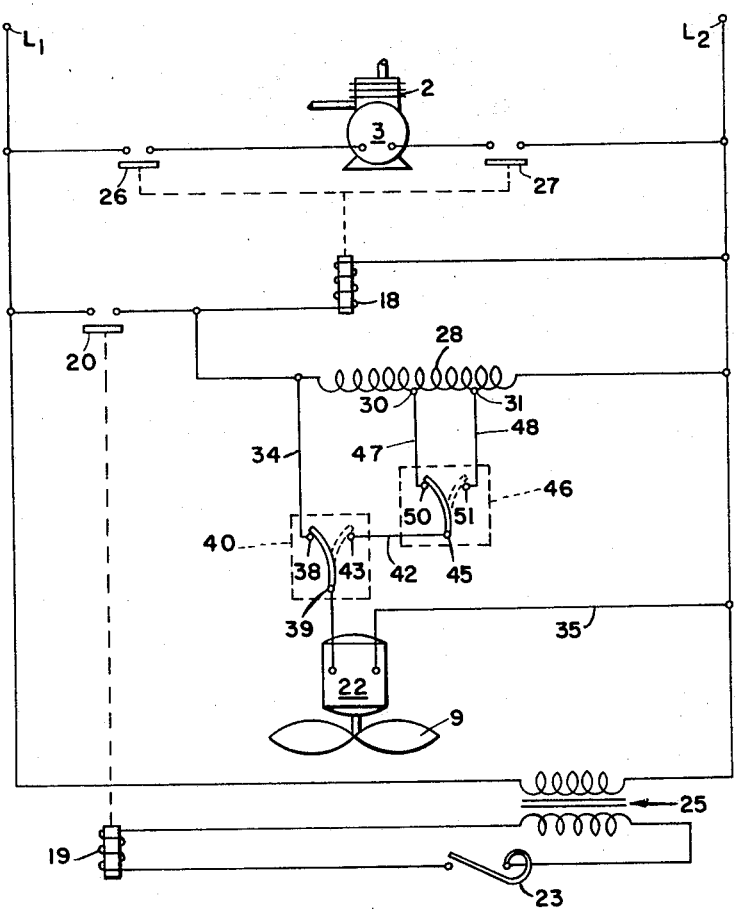
INVENTOR.
RICHARD H. GEISLER
BY
*Frederick E. McMullen*
ATTORNEY.

United States Patent Office 3,293,876
Patented Dec. 27, 1966

3,293,876
REFRIGERATION SYSTEM INCLUDING CONTROL ARRANGEMENT FOR MAINTAINING HEAD PRESSURE
Richard H. Geisler, Syracuse, N.Y., assignor to Carrier Corporation, Syracuse, N.Y., a corporation of Delaware
Filed Oct. 28, 1964, Ser. No. 407,116
3 Claims. (Cl. 62—184)

This invention relates to refrigeration systems, and particularly, to a control arrangement for maintaining head pressure in refrigeration systems of the type employing an air-cooled condenser.

In refrigeration systems which employ air-cooled condensers, the condenser, normally out-of-doors, is subject to the vagaries of atmospheric weather conditions. Where outdoor temperatures are relatively high, as for example, during the summer, the temperature and pressure of the refrigerant flowing from the condenser to the system expansion device is relatively high. However, when outoutdoor temperatures are relatively high, for example, during the winter, the temperature, and correspondingly the pressure, of the refrigerant flowing from the condenser to the system expansion device is reduced. The reduction in pressure of the refrigerant between the condenser and expansion device reduces the amount of refrigerant fed to the system evaporator by the expansion means with a corresponding reduction in system capacity.

It is a principal object of the present invention to provide a new and improved control arrangement for governing the capacity of an air-cooled condenser in response to a condition of the refrigerant discharged therefrom.

It is a further object of the present invention to provide a unique control arrangement for use with refrigeration systems employing air-cooled condensers effective to adjust the capacity of the condenser in response to refrigeration system conditions.

It is an object of the present invention to provide a control for regulating power input to the fan drive motor of an air-cooled condenser in response to the load imposed upon the refrigeration system.

This invention relates to a refrigeration system comprising in combination compression means having suction and discharge sides, expansion means, first heat exchange means connecting the compression means discharge side with the expansion means, second heat exchange means connecting the expansion means wtih the compression means suction side, a fan for bringing air into heat exchange relationship with the first heat exchange means, a drive motor for the fan; a circuit for energizing the drive motor; an inductance across the drive motor circuit having at least one reduced voltage tap; a switch in the drive motor circuit between the drive motor and the inductance, the switch being adapted when moved to connect the drive motor with the reduced voltage tap to reduce power input to the fan drive motor; and means for moving the switch in response to a predetermined condition of the refrigerant at the first heat exchange means to energize the fan drive motor through the reduced voltage tap.

Other objects and features of the invention will be apparent upon a consideration of the specification and drawings in which:

FIGURE 1 is a view of a refrigeration system embodying the control arrangement of the present invention; and FIGURE 2 is a circuit diagram illustrating applicant's novel condenser fan control arrangement.

Referring to FIGURE 1 of the drawings, there is shown a conditioning unit 1 having a closed refrigeration system incorporating applicant's control arrangement.

Conditioning unit 1 includes a compressor 2 operatively connected to and driven by motor 3. Compressor 2 discharges relatively hot gaseous refrigerant at a relatively high pressure through line 5 to condenser 6. Condenser 6 serves to condense the relatively hot pressurized refrigerant gas to liquid as air under the influence of fan 9 flows over the surface of the condenser extracting heat therefrom. Fan 9 is driven by electric motor 22.

Liqiud refrigerant formed in condenser 6 passes through line 12 to a suitable expansion device 13, shown in the form of a capillary tube. While a capillary tube type expansion device is shown, other types of expansion devices, for example an expansion valve, may be utilized.

Refrigerant from expansion device 13 passes through line 15 to evaporator 16. The refrigerant passing through evaporator 16 is converted to vaporous refrigerant as it extracts heat from the medium therearound. The cooled medium, for example air, is thereafter directed by suitable means (not shown) to the area to be conditioned to cool the same. Vaporized refrigerant formed in evaporator 16 flows through suction line 21 into the compressor 2 to complete the refrigerant flow cycle.

Referring to FIGURE 2 of the drawings, a suitable source of alternating current (not shown) is adapted to supply current via leads $L_1$, $L_2$ to a primary control circuit. It will be understood that the system can operate on three-phase current if suitably modified.

Contacts 26, 27 connect compressor drive motor 3 across leads $L_1$, $L_2$. Contactor coil 18, connected in series with control switch 20 across leads $L_1$, $L_2$, regulates contacts 26, 27. Control relay 19, in series with thermostat switch 23 in the secondary control circuit, regulates control switch 20. Step-down transformer 25 electrically connects the primary and secondary control circuits.

Coil 28 having reduced voltage terminals 30, 31 is series connected with control switch 20 across leads $L_1$, $L_2$. Lines 34, 35 connect condenser fan motor 22 across coil 28 through terminals 38, 39 of temperature responsive switch 40. Line 42 connects terminal 43 of switch 40 to terminal 45 of temperature responsive switch 46. Lines 47, 48 connect terminals 50, 51, respectively, of switch 46 to reduced voltage terminals 30, 31, respectively, of coil 28.

Temperature responsive switches 40, 46 are preferably fastened to line 12 between condenser 6 and expansion device 13. Switches 40, 46 respond to predetermined temperature conditions of the refrigerant flowing through line 12 from condenser 6 to expansion device 13 to regulate power input to fan motor 22 as will be more particularly explained hereinafter. Switches 40, 46 may, in the alternative, be secured to condenser 6, preferably adjacent the discharge end thereof.

On closure of thermostat switch 23, in response to a demand for cooling, control relay 19 is energized to close control switch 20 and energize compressor contactor coil 18 and the condenser fan motor 22. Compressor contactor coil 18 closes contacts 26, 27 to energize compressor drive motor 3.

Where temperature of the refrigerant feeding from condense 6 through line 12 to expansion device 13 is above the predetermined temperatures required to actuate switches 40, 46, temperature responsive switch 40 bridges terminals 38, 39 thereof. Condenser fan motor 22 is accordingly series connected through control switch 20, line 34, switch 40 and line 35 across leads $L_1$, $L_2$ whereby full line voltage is applied to condenser fan motor 22. Fan motor 22 operates at maximum power.

Temperature responsive switch 46 bridges terminals 45, 50 thereof. The usual operating positions of temperature responsive switches 40, 46 are shown by solid line in FIGURE 2 of the drawings.

Should temperature of the refrigerant in line 12 between condenser 6 and expansion device 13 decrease, due for example to a decrease in outdoor ambient temperature, temperature responsive switch 40, at a first predetermined refrigerant temperature, breaks the circuit between lines 34 and 35 and bridges terminals 39, 43 thereof. Condenser fan motor 22 is energized through reduced voltage tap 30 of coil 28, line 47, switch 46, line 42, switch 40 and line 35. The corresponding reduction in input voltage to fan motor 22 reduces output of fan 9.

Should temperature of the refrigerant in line 12 connecting condenser 6 to expansion device 13 further decrease, temperature responsive switch 46, at a second preset refrigerant temperature, breaks the circuit between lines 42, 47 and bridges terminals 45, 51 to complete a circuit from reduced voltage tap 31 of coil 28, line 48, switch 46, line 42, switch 40, and line 35 to energize fan motor 22 through reduced voltage tap 31 of coil 28. The resulting further reduction in voltage applied to fan motor 22 with a corresponding reduction in fan motor power effects a further reduction in output of condenser fan 9.

It is understood that on a subsequent rise in the temperature of the refrigerant in line 12 above the preset responding temperatures of switches 46, 40, switches 46, 40 step up input voltage to fan motor 22 to restore, in increments determined by refrigerant temperature conditions, full power to condenser fan motor 22.

While switches 40, 46 are disclosed as temperature responsive type switches, it is understood that pressure responsive type switches may be employed. Additionally, it is understood that the number and location of reduced voltage taps of coil 28 may be varied to give desired power input gradients to the condenser fan motor 22. For each added voltage tap, an additional refrigerant temperature responsive control switch therefor, suitably secured to refrigerant line 12, is employed.

While I have described a preferred embodiment of the invention, it will be understood that the invention is not limited thereto since it may be otherwise embodied within the scope of the following claims.

I claim:

1. In a refrigeration system including compression means having suction and discharge sides, expansion means, first heat exchange means connecting the compression means discharge side with the expansion means, second heat exchange means connecting the expansion means with the compression means suction side, and a fan for bringing air into heat exchange relationship with said first heat exchange means, the combination of a drive motor for said fan; a circuit for energizing said drive motor; an inductance across said drive motor circuit having at least one reduced voltage tap; a switch in said drive motor circuit between said drive motor and said inductance, said switch being adapted when moved to connect said drive motor with said reduced voltage tap to reduce power input to said fan drive motor; and means for moving said switch in response to a predetermined condition of the refrigerant leaving said first heat exchange means to energize said fan drive motor through said reduced voltage tap.

2. A refrigeration system according to claim 1 in which said inductance includes a second reduced voltage tap, a second switch connected between said second reduced voltage tap and said first-mentioned switch, said second switch being adapted when moved to connect said drive mator through said first-mentioned switch with said second reduced voltage tap to further reduce power input to said fan drive motor, said switch moving means being adapted to move said second switch in response to a second predetermined condition of the refrigerant leaving said first heat exchange means to energize said first drive motor through said second reduced voltage tap.

3. In a refrigeration system including compression means, a condenser, expansion means, and an evaporator connected to form a closed path for refrigerant flow, and a fan for moving air over the condenser, the combination of a motor for driving said fan; a circuit for connecting said fan motor across a source of alternating current energy; a coil; switching means for interposing predetermined portions of said coil in series with said fan motor energizing circuit to reduce power input to said fan motor with corresponding reduction in condenser fan output; and means for controlling said switching means in response to refrigerant conditions between said condenser and expansion means, said controlling means being adapted at a first predetermined refrigerant condition to actuate said switching means to a first operating position whereby a first portion of said coil is series connected with said fan motor energizing circuit, said controlling means being adapted at a second predetermined refrigerant condition to actuate said switching means to a second operating position whereby a second portion of said coil is series connected with said fan motor energizing circuit.

References Cited by the Examiner

UNITED STATES PATENTS 2,705,404  4/1955  Malutich _____ 62—184
2,952,991  9/1960  St. Pierre _____ 62—184

MEYER PERLIN, *Primary Examiner.*